J. K. SHARPE, Jr. & C. N. LEONARD.
MOTOR VEHICLE.
APPLICATION FILED AUG. 17, 1908.

929,794.

Patented Aug. 3, 1909.
2 SHEETS—SHEET 1.

Witnesses,

Inventors,
Joseph K. Sharpe, Jr. and
Charles N. Leonard.
By James A. Walsh,
Attorney.

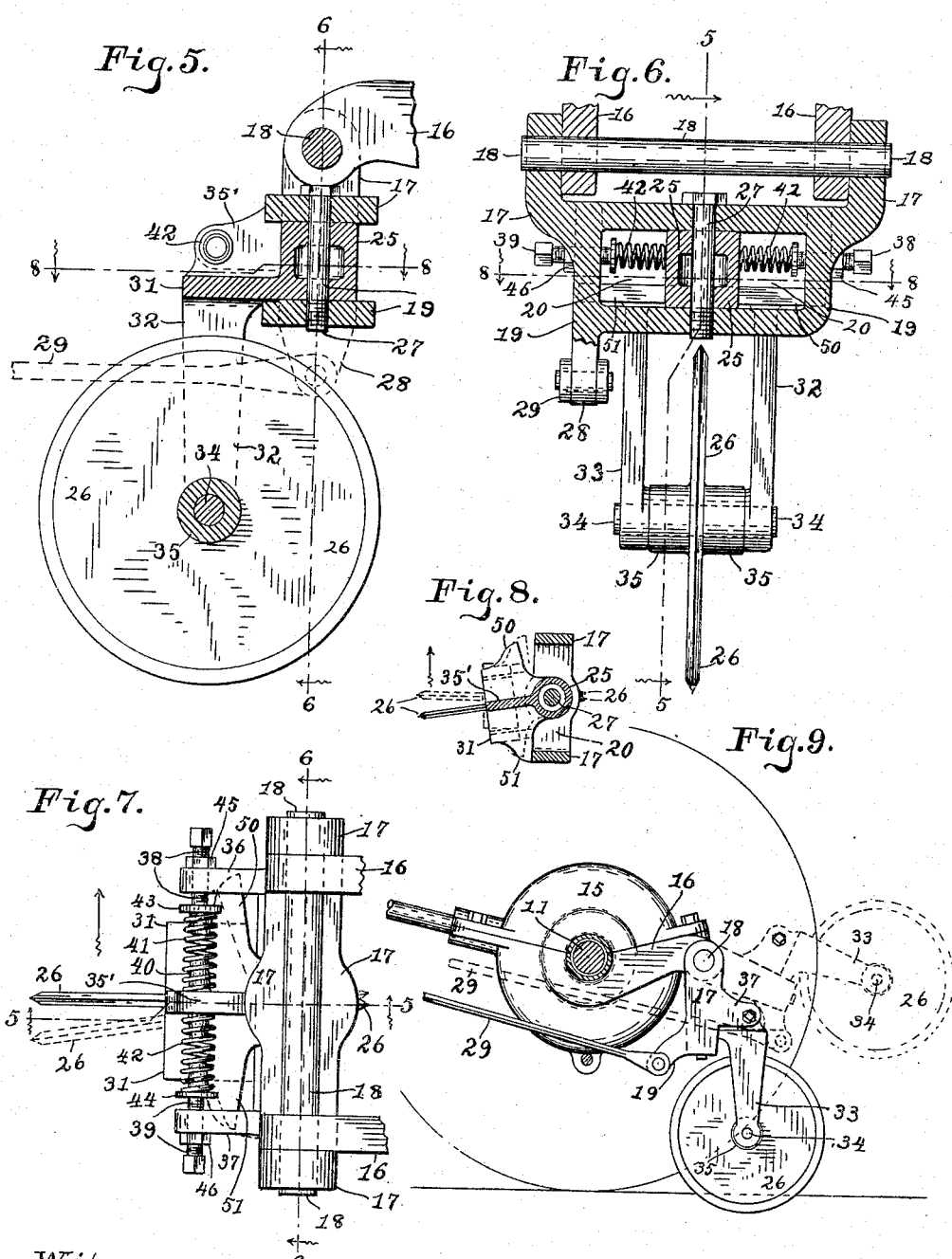

UNITED STATES PATENT OFFICE.

JOSEPH K. SHARPE, JR., AND CHARLES N. LEONARD, OF INDIANAPOLIS, INDIANA; SAID LEONARD ASSIGNOR TO SAID SHARPE.

MOTOR-VEHICLE.

No. 929,794.  Specification of Letters Patent.  Patented Aug. 3, 1909.

Application filed August 17, 1908. Serial No. 448,772.

*To all whom it may concern:*

Be it known that we, JOSEPH K. SHARPE, Jr., and CHARLES N. LEONARD, citizens of the United States, residing at Indianapolis, in the county of Marion and State of Indiana, have invented certain new and useful Improvements in Motor-Vehicles, of which the following is a specification.

In operating motor vehicles over paved and unpaved roadways considerable difficulty is experienced and many accidents occur by loss of control of the vehicle through skidding, as, where the roadway is inclined or in slippery or muddy condition, the tractional tread of the vehicle wheels is insufficient to maintain it securely in proper position, and by its gravity the vehicle is caused to skid sidewise, this skidding movement occurring so quickly and unexpectedly that the motorist is unable to control the vehicle further than by applying the brakes to stop the rotary motion of the wheels, depending upon obstructions or other conditions to check such skidding movement. To prevent this it has been the practice to provide means in connection with the tires of the vehicle wheels of such character as to impart greater tractional power thereto, but which have a tendency to injure the material composing such tires or to affect the resiliency thereof.

The object of our present invention is to provide means for maintaining and steering the vehicle in proper position on the roadway and to prevent the skidding thereof, and which means we apply to the vehicle independently of the tread of its wheels and without disturbing the tires thereof.

Figure 1:
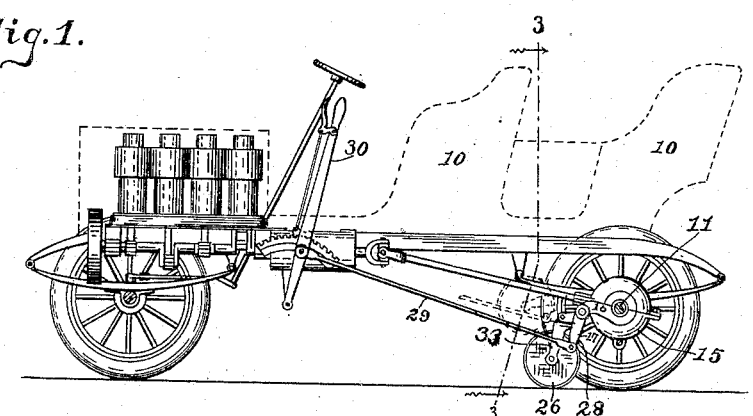
Figure 2:
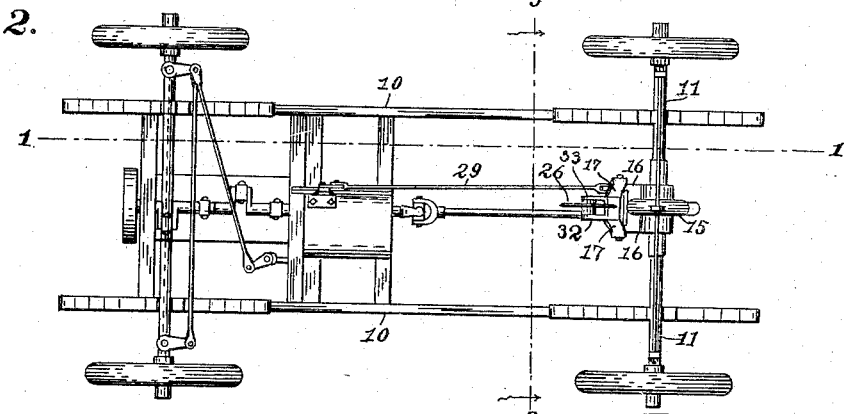
Figure 3:
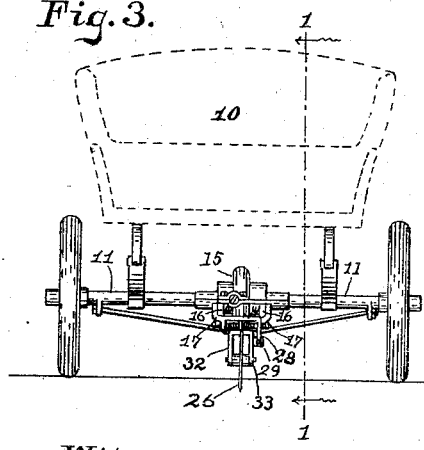
Figure 4:
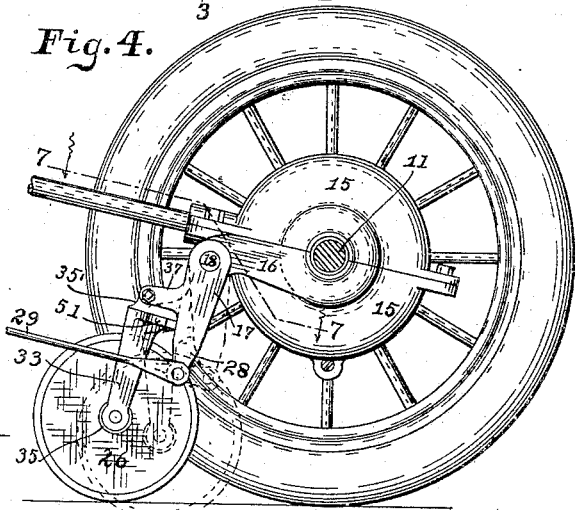

In the accompanying drawings, which are made a part hereof, and in which similar reference characters indicate similar parts, Figure 1 is a side elevation, partially in section, on the dotted line 1—1 in Fig. 3, of a motor vehicle, showing our invention as applied to the rear axle thereof; Fig. 2, an under plan; Fig. 3, a detail section on the dotted line 3—3 in Figs. 1 and 2; Fig. 4, an enlarged detail; Fig. 5, an enlarged detail on the dotted lines 5—5 in Figs. 6 and 7; Fig. 6, a detail on the dotted lines 6—6 in Figs. 5 and 7; Fig. 7, a detail on the dotted line 7—7 in Fig. 4; Fig. 8, a detail on the dotted lines 8—8 in Figs. 5 and 6; and Fig. 9 is an enlarged detail showing a modified arrangement of our device.

In said drawings the portions marked 10 represent the vehicle body, which may be mounted on a truck of any desired construction, and equipped with appropriate motor and operating devices. We have chosen to illustrate our invention as associated with the rear axle, 11, and gear casing, 15, which latter we provide with arms, 16, to which is pivotally attached a bracket, 17, (Fig. 6), by means of the pin, 18. The lower portion, 19, of said bracket 17 is provided with a chamber, 20, forming a stock for the reception of the shank, 25, of steering wheel, 26, said shank being pivotally mounted in said stock by the pin, 27. Said bracket 17 is also provided with an arm, 28, to which is pivotally connected an operating rod, 29, communicating with an adjustable handle-bar, as 30, of any desired construction, or any other appropriate operating means within convenient reach of the motorist. The lower portion, 31, of said shank 25 projects outwardly, and depending therefrom are the arms, 32 and 33, at the lower ends of and between which arms is mounted said steering wheel 26, by means of an appropriate axle, 34, said wheel being preferably provided with hubs, 35, to insure a stable and durable structure.

Above the projecting member 31 we provide the arms, 36, 37, which extend outwardly from bracket 17, which arms are in alinement with an apertured ear, 35', forming a part of member 31. Through said arms 36, 37, set bolts 38, 39, are inserted, and a pin 40 is secured in ear 35', springs, 41, 42, being coiled about set bolts 38, 39 and pin 40 between ear 35' and collars 43, 44, on said bolts. The tension of said springs may be regulated by advancing them inwardly or outwardly as desired by means of nuts 45, 46. It is desirable to positively limit the swiveling movements of the steering wheel shank, and consequently the lateral turning or twisting of the steering wheel, and for this purpose the projecting member 31 is formed at both of its rear sides, 50, 51, to act as a stop, which, when it abuts at either side against bracket portion 19, prevents further swiveling in that direction. The steering wheel 26 we have shown as of a disk form, with beveled edge, but which may be of any suitable construction for the purpose, as will be readily understood. This steering and anti-skidding device, as indicated in Fig. 4, may be placed forward of the axle 11 to be swung toward and from the roadway and so held by means of the operating rod 29 and adjustable handle-bar 30, or where desirable, as indicated in Fig. 9, may be so positioned as to be swung back of said axle.

In operation, the motorist, by means of handle-bar 30 (or other suitable operating device) and rod 29, swings the steering wheel to the roadway, and by proper manipulation of said operating device may force the steering wheel into the roadway, with the effect that the momentum of the vehicle will cause said wheel to rotate and act as a rudder to steer the vehicle through muddy or soft roads. In case of skidding on paved roadways or otherwise, the steering wheel is brought into contact therewith, and because of its gripping character and flexible mounting sufficient pressure may be applied to forcibly contact it with the roadway with the effect that side skidding of the vehicle will be prevented. By reason of its flexible mounting and the severe strain under skidding conditions the tendency of the steering wheel will be to twist or turn out of parallel with the vehicle wheels, and, in order to maintain it in such parallel relation, the springs 41, 42, operate to oppose this twisting strain, thus automatically adjusting said steering wheel whenever the side strain is sufficient to cause it to twist slightly from side to side. By means of stops, 50, 51, however, when such twisting strain is so great as to be uncontrollable by the springs, the swiveling action of said wheel is positively limited by contact of said stops with bracket portion 19. As will be readily understood, when said steering wheel is turned or twisted it will assume a position at an angle in relation to the carrying wheels and will be headed in a direction opposite to that of the side movement of the vehicle when skidding, so that when said vehicle is moving forwardly and also skidding sidewise the rotating steering wheel will act to properly adjust the vehicle while advancing and at the same time affording a resistance against the side skidding thereof. It will thus be seen that said steering wheel at all times, either in normal or swiveled position, when contacting with the roadway, is in such relation to the carrying wheels as to exert a powerful frictional contact with the roadway in a direction opposite to that of the movement of the vehicle when skidding, with the effect that such skidding movement is quickly overcome; and when a vehicle is on muddy or narrow and dangerous roadways, requiring great care on the part of the motorist, the employment of this steering wheel, which may be forced into the ordinary roadway, acts as a guide for steering the vehicle along the desired path, as well as preventing it from skidding from side to side.

Under normal conditions, where the operation of the steering wheel is unnecessary, it may be swung up in front of the axle and held from contact with the roadway, as indicated by dotted lines in Fig. 1, or where it is preferable to mount it to swing behind the axle, as indicated in Fig. 9, it may be as readily swung into and out of position. As indicated by the full and dotted lines in Fig. 4, said steering wheel may be swung to the surface of or forced into the roadway and so held, as may be desired, by proper manipulation of the handle-bar or other device for operating said wheel. While we have shown this device as applied to the axle and gear casing, we do not wish to be understood as limiting ourselves to this exact arrangement, as our steering and anti-skidding wheel may be arranged to be supported and operated from any appropriate part of the vehicle.

We claim as our invention:

1. The combination, with a vehicle, of a pivoted bracket, a steering-wheel holder pivotally mounted in said bracket, a wheel mounted in said holder, yielding means for maintaining said holder in normal position, means for positively limiting the pivotal movement of said holder, and means for swinging said holder and wheel toward and from said vehicle.

2. A steering and anti-skidding device for motor vehicles comprising a bracket, a chamber in said bracket constituting a stock, a steering-wheel holder swivelingly mounted in said stock, a wheel at the lower end of said holder, springs associated with said holder for opposing the swiveling action thereof, and means for raising and lowering said device in relation to the vehicle.

3. A steering and anti-skidding device for motor vehicles, comprising a pivotally mounted bracket, a steering-wheel holder swivelingly mounted in said bracket, a steering and anti-skidding wheel supported by said holder, means for maintaining said holder and wheel in proper relation to the vehicle wheels, and means for positively limiting the swiveling action of said holder.

In testimony whereof we affix our signatures in presence of two witnesses.

JOSEPH K. SHARPE, Jr.
CHARLES N. LEONARD.

Witnesses:
CHARLES E. SLOAN,
JAMES A. WALSH.